United States Patent [19]

Allen

[11] 4,148,155

[45] Apr. 10, 1979

[54] SYSTEM AND APPARATUS FOR AUTOMATICALLY FEEDING PLANTS

[76] Inventor: Donavan J. Allen, Rte. 4, Berry Rd., Greer, S.C. 29651

[21] Appl. No.: 820,342

[22] Filed: Jul. 29, 1977

[51] Int. Cl.$^2$ ............................................. A01G 27/00
[52] U.S. Cl. ............................................. 47/59; 47/79; 119/77; 137/454; 222/528
[58] Field of Search ............... 222/527, 528, 457, 585; 119/77; 137/453, 454; 47/79-82, 59-64, 40.5

[56] References Cited

U.S. PATENT DOCUMENTS

| | | | |
|---|---|---|---|
| 867,621 | 10/1907 | Tannehill | 119/77 |
| 1,548,222 | 8/1925 | Spreen | 119/77 UX |
| 2,154,152 | 4/1939 | Devary et al. | 119/77 |
| 2,288,678 | 7/1942 | Blumentritt | 47/79 |
| 2,336,755 | 12/1943 | Sejarto | 47/62 |
| 2,519,166 | 8/1950 | White | 47/79 |
| 3,067,543 | 12/1962 | Bracey | 47/80 |
| 3,137,969 | 6/1964 | Sokol | 47/79 X |
| 3,181,743 | 5/1965 | Libit et al. | 222/528 |
| 3,438,575 | 4/1969 | Rohling | 47/79 X |
| 3,754,352 | 8/1973 | Bates | 47/80 X |

FOREIGN PATENT DOCUMENTS 1473290 2/1967 France ............................................. 47/79

Primary Examiner—Robert E. Bagwill
Attorney, Agent, or Firm—Bailey, Dority & Flint

[57] ABSTRACT

A system and apparatus for growing plants in a nutrient solution while supported in an inert medium contained in a pot container includes a nutrient solution reservoir and automatic feeder apparatus for maintaining a predetermined level of nutrient solution in the container including a tube member connected to the reservoir having an open end carried a predetermined distance above the container bottom for dispensing the solution. An air vent communicates with the tube member allowing air to enter the reservoir in response to the level of nutrient solution in the container falling below the open end of the tube member as the solution is drawn by capillary action through the media into the roots. The nutrient solution flows into the container until the open end of the feeder tube is covered so as to continuously maintain the level of nutrient solution. An overflow opening drains excess liquid from the pot preventing overwatering and stagnation when used outdoors.

5 Claims, 9 Drawing Figures

U.S. Patent  Apr. 10, 1979  4,148,155
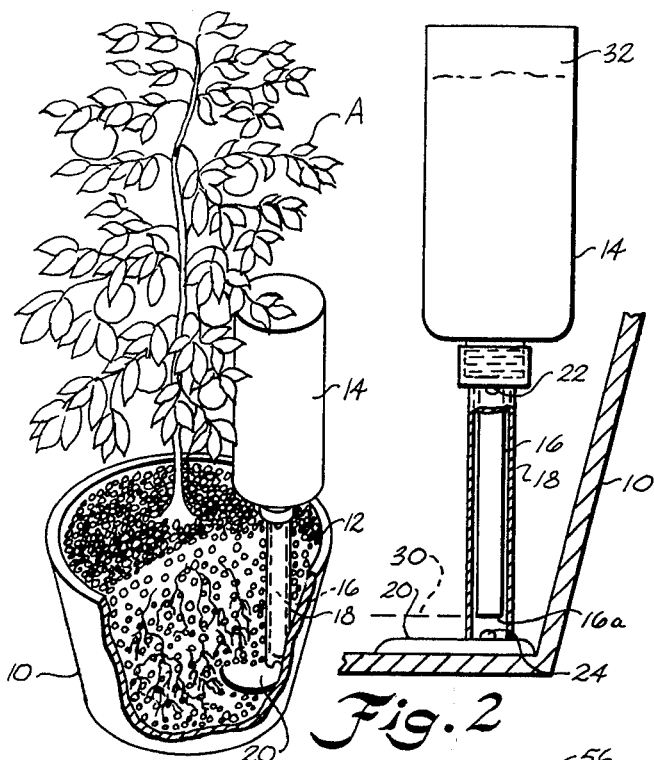
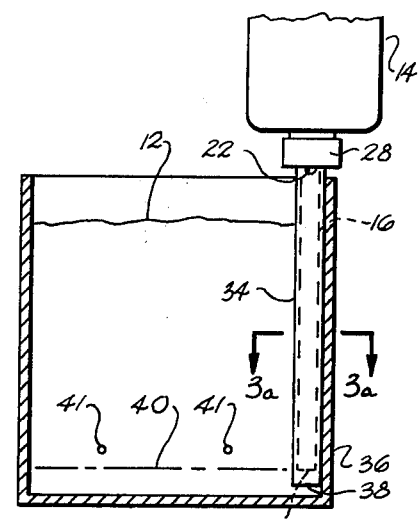
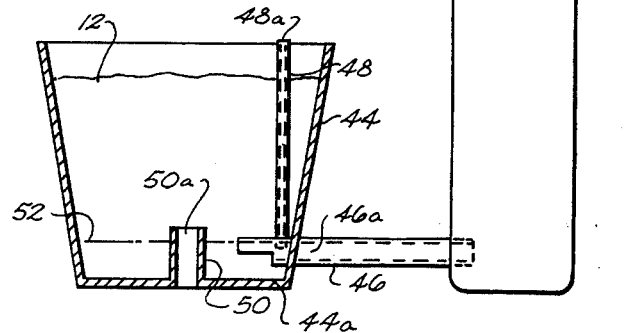
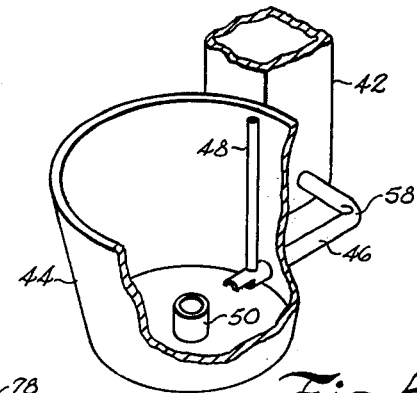
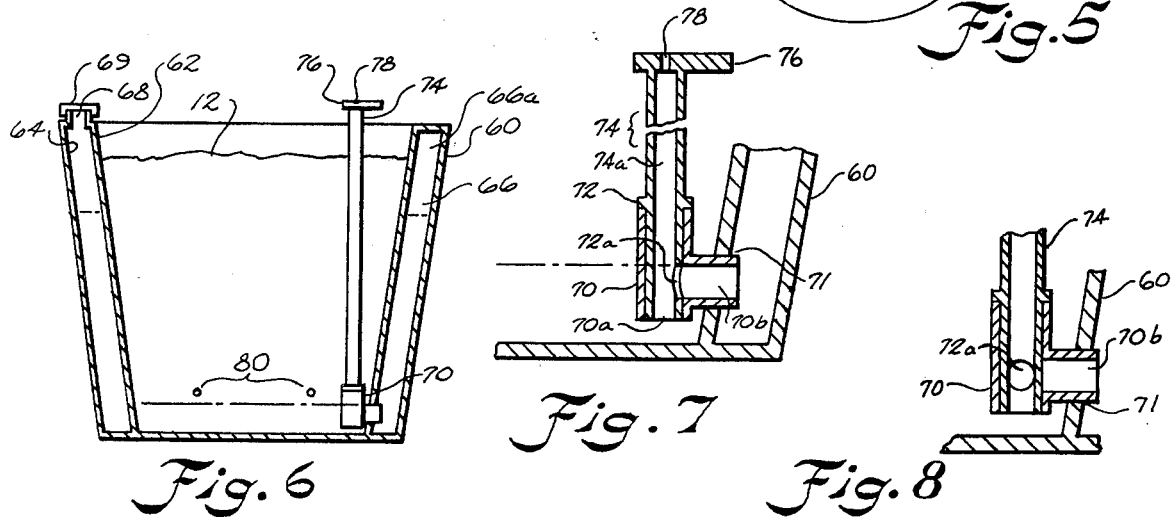

SYSTEM AND APPARATUS FOR AUTOMATICALLY FEEDING PLANTS

BACKGROUND OF THE INVENTION

Systems have been heretofore proposed commonly referred to as hydroponic systems wherein a plant root system is mechanically supported in an inert medium while the plant is fed a nutrient solution consisting of metered amounts of an exact formulation. Such systems normally grow plants, vegetables, and fruits which more fully reach their potential in appearance and taste. The systems are extremely clean since they do not utilize soil but rather an inert medium such as pea gravel or sand for supporting the plant and are particularly suitable for the indoor growing of plants. However, problems have been encountered in the prior hydroponic systems in the feeding of the nutrient solution to the plant. Prior systems have utilized pumps in an attempt to deliver the proper amount of nutrient to the plant which are controlled by timing circuits so as to deliver only a required amount of nutrient solution at proper intervals. While such operations may be suitable for commercial operations, such are not suitable for the average individual as they are costly and require rather sophisticated installations. Other systems have sought to utilize wick feeding of the nutrient solution but a problem arises in that much of the nutrient is filtered out in the wick, and cannot furnish nutrient solution fast enough to large plants.

SUMMARY OF THE INVENTION

It has been found that a system and apparatus for automatically feeding and growing plants supported in an inert medium can be provided by a pot container containing an inert medium and a reservoir for containing a nutrient solution. Feeder means for automatically maintaining a predetermined level of the nutrient solution in the container includes a tube member connected adjacent one end to the reservoir and open at a remote end thereof for dispensing the solution. The tube member is carried in the container with the open end disposed at a predetermined distance above the bottom thereof defining generally the predetermined level of nutrient solution. An air vent communicates with the tube member allowing air to enter the reservoir in response to the level of the nutrient solution in the container falling below the open end of the tube member.

Accordingly, an important object of the present invention is to provide a system for growing plants in an inert medium having automatic feeding apparatus for continuously maintaining a predetermined amount of nutrient solution in the system.

Yet another important object of the present invention is to provide an economical system and apparatus for automatically feeding and growing plants supported in an inert medium which requires little attention by the home gardener and eliminates any guess work in the plant feeding.

Still another important object of the present invention is to provide a system and apparatus for maintaining a predetermined level of nutrient solution in a container supporting a plant in an inert medium wherein the amount of liquid containable in the pot is limited so as to avoid flooding of the plant due to rainfall when the system is utilized outdoors.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a system for growing plants supported in an inert medium and apparatus for automatically feeding the plants a nutrient solution;

FIG. 2 is an enlarged partially cut-away front elevation of the automatic nutrient feeder apparatus of FIG. 1;

FIG. 3 is a partially cut-away front elevational view of an alternate embodiment of automatic feeder apparatus constructed in accordance with the present invention;

FIG. 3a is a sectional view taken along line 3a—3a of FIG. 3;

FIG. 4 is a partially cut-away front elevational view of another embodiment of a system and automatic feeder apparatus constructed in accordance with the present invention;

FIG. 5 is a partially cut-away perspective view illustrating the system and apparatus of FIG. 4 wherein the feeder tube member is flexed to provide a closed valve in accordance with the present invention;

FIG. 6 is a partially cut-away front elevational view of yet another embodiment of a system and apparatus for growing and automatically feeding a plant constructed in accordance with the present invention;

FIG. 7 is an enlarged sectional view of the nutrient dispensing tube and valve arrangement of FIG. 6 when in an open position; and FIG. 8 is an enlarged sectional view of the nutrient dispensing tube member and valve of FIG. 6 when in a closed position.

DESCRIPTION OF A PREFERRED EMBODIMENT

Illustrated in FIG. 1 is a pot container 10 for containing an inert medium 12 which mechanically supports the root system of a plant A. The plant is automatically fed a nutrient solution which is contained in a reservoir 14 and dispensed therefrom by means of a tube member 16 which is carried concentrically within a standpipe 18 supported on a base portion 20 surrounded by the inert medium 12. An air inlet opening 22 is provided adjacent an upper edge of the standpipe 18 and a dispensing outlet 24 is formed in a lower portion of the standpipe 18 adjacent the base portion 20 for delivering the nutrient solution into the container pot 10.

The base 20 is in the form of an enlarged circular flange which serves to hold the standpipe in an upright straight position. The flange also keeps the standpipe from accidentally being pulled out of the pot or otherwise being altered in its position which would change the level of nutrient in the bottom of the pot 10.

The reservoir 14 is illustrated in the form of a bottle having an open threaded neck portion 14a which threadably receives a cap 28 having a collar 28a into which one end of the tube member 16 is fixably received. The opposing end of the tube member 16 is open at 16a for dispensing the nutrient solution from the reservoir 14. The reservoir 14 is carried on an upper edge of the standpipe 18 so that the open end 16a of the tube member is disposed a predetermined distance above the bottom of the container 10 to define the predetermined level 30 at which the nutrient solution is maintained in the container 10. It has been found that for most normal applications, the diameter of tube 16 should be approximately 5/16 of an inch. This is large enough so that surface tension will not keep the water from flowing out of the open end 16a but small enough so that the nutrient solution will not flow freely from the tube. Furthermore, a distance of 3/16 of an inch has been found to provide advantageous results for the level 30 of the nutrient and the distance of open end 16a. By creating these conditions, the solution is pulled away from the bottom of the pot and tube 16 and overwatering and stagnation of the solution is prevented.

According to the invention, the nutrient solution in the reservoir, which normally comprises water and a plant food nutrient, will flow from the open end 16a of the tube member 16 and be delivered into the container by way of outlet 24 whenever the level 30 of the nutrient solution falls below the open end 16a. This permits air to enter the air vent 22 and pass through the open end 16a of the tube member into the reservoir 14 wherein the vacuum in the space 32 is relieved allowing liquid to flow until the nutrient level is once again brought up to the level of open end 16a so as to cover the opening and prevent air passage therethrough. Thus the flow of nutrient solution is stopped and the level of nutrient is automatically and continuously maintained at 30.

FIG. 3 illustrates another form of the invention wherein the standpipe member 18 is provided by a similar standpipe 34 which is secured to the side of a container pot 36 instead of being supported in the pot on a base portion 20 as illustrated in FIGS. 1 and 2. The standpipe 34 may be secured in any suitable manner such as by gluing or may be made as one piece with the pot. The remainder of the embodiment in FIG. 3 is identical to that in FIGS. 1 and 2 except that the bottom of the standpipe is completely open so as to provide a dispensing outlet 38 for the nutrient solution. In a like manner, the level of the nutrient solution would be maintained at 40 which would be approximately 3/16 of an inch. It will be noted that the reservoir 14 may be filled with nutrient solution merely by removing the reservoir 14 and the tube member 16 from the standpipe 18 or 34 and turning the reservoir upsidedown and removing the cap 28. Following filling of the reservoir 14, the cap 28 is tightly threaded on the neck 14a and the reservoir is once again inverted with the tube member 16 being generally concentrically received within the standpipe.

Overflow means is provided by aperatures 41 in the sidewall of the container through which excess liquid drains upon exceeding the height of the aperatures above the container bottom. This is particularly advantageous when using the system outdoors so that rain is drained preventing drowning out of the plant. The overflow means also provides a way of flushing out the medium 12 to remove excess salts from the media for indoor and outdoor plants.

Owing to the large amounts of nutrient solution required for medium to large size plants such as tomato plants and other medium vegetables and flower plants which are popular, a much larger nutrient reservoir is required. For this purpose, the embodiment illustrated in FIG. 4 includes an enlarged reservoir 42 which is carried completely outside a container pot 44 having a much larger capacity than that possible with the arrangements illustrated in FIGS. 1 through 3. It is for this reason that this form of the invention is particularly advantageous and desirable. In this arrangement, a tube member 46 is carried in the sidewall of the container 44. The tube member 46 may be affixed in any suitable manner such as by affixing the tube in an opening in the sidewall of the container in any suitable manner such as by gluing. In this arrangement, an air vent means is provided by an upstanding tube 48 which is carried by the tube member 46 and communicates with the interior passageway 46a thereof. The opposing end of the air vent tube 48 is open at 48a for the passage of air therethrough and accordingly extends above the level of the inert medium contained in the pot.

The overflow means for limiting the level of liquid in the container is provided by an upright overflow pipe 50 formed in the bottom 44a of the container being open in the top and having a central opening 50a extending therethrough. In a case where the system is utilized outdoors, should rainfall fill the pot above the top of overflow pipe 50, the excess water will flow over the top and down through the central opening thereof. According to the invention, a level 52 of nutrient solution will be automatically maintained in the pot since nutrient solution from the reservoir 42 will flow into the pot until the nutrient level covers the end of the passage 46a which opens into the container 44. Should the nutrient level fall below the opening of the tube member, air will pass through the air vent tube 48 into the reservoir 42 into the space 54 relieving the vacuum in the reservoir and allowing the nutrient solution to flow into the container until the level 52 is once again attained covering the opening of passageway 46a.

In order to refill the reservoir 42, it is necessary to prevent the nutrient solution from flowing in the tube member 46 once the reservoir is open to the atmosphere relieving the vacuum in the space 54. The reservoir 42 is open at the top thereof but is provided with a closure member 56 which may be selectively opened and closed for filling the reservoir 42. According to the invention, a unique valve for closing the flow at 46 is provided by utilizing a piece of flexible tubing for the tube member 46 whereby the tubing may be bent at 58 preventing flow in the tube member while the reservoir is being filled with nutrient solution. Thus, numerous advantageous results are achieved by using flexible tubing at 46 whereby not only is delivery of the nutrient solution provided but the elimination of valving hardware is achieved resulting in simplified refilling procedures and apparatus.

Referring now to FIG. 6, another embodiment of the invention is shown wherein the container pot and reservoir for the nutrient solution are provided in a unitary structure which includes a container pot 60 having a double wall structure wherein one wall 62 is disposed within an outer wall 64. A reservoir 66 for the nutrient solution is provided in the hollow space defined between the inner and outer walls. A reservoir inlet is provided at 68 having a closure member 69 in the form of a removable cap for selectively opening and closing the reservoir inlet. A tube member 70 is provided in the form of a generally T-shaped member fitted and affixed within an opening 71 in the inner sidewall 62 of the container 60. The tube member communicates with the reservoir 66 and includes valve means provided by a rotatable valve member 72 carried in the tube member 70. As illustrated, the valve member includes an opening 72a which allows communication between the reservoir 66 and an open end 70a of the tube member when rotated to the position as shown in FIG. 7. The flow of the nutrient solution in the tube member is cut off when the valve member 72 is rotated to the position shown in FIG. 8 wherein the valve opening 72a is out of communication with a passage 70b of the tube member which communicates with the reservoir. In this manner, the flow in the tube member may be cut off when the closure member 69 is removed for filling the reservoir 66.

Air vent means is provided for the reservoir which includes an upstanding tube 74 made integral or as one piece with the rotatable valve 72 having a handle portion 76 with an opening 78 formed therein which communicates by way of a hollow bore 74a with the reservoir 66 through opening 72a and passage 70b. The upstanding tube 74 also serves to actuate and rotate the valve member 72. The vacuum in the space 66a of the reservoir 66 will be relieved by air passing through the opening 78 when the nutrient level falls below the level of the opening 71 in a like manner as discussed in relation to previous embodiments. Air may also enter the feeder tube openings in 46a and 70a through seepage through the inert medium 12 if coarse medium is used and in some cases, the air vent tubes may not be required.

Thus, it can be seen that an advantageous construction can be had for a system and apparatus according to the invention for automatically growing and feeding plants in an inert medium. The system is economical and simple to operate affording utilization by the average home gardener. A proper amount of nutrient solution is maintained in the system at all times in a highly reliable yet in a simple operational manner eliminating any guess work in plant feeding. The gardener need only be sure that nutrient solution is maintained in the reservoir at all times and the automatic feeder apparatus according to the invention will always maintain a predetermined level of nutrient solution in the container pot. The root of the plant A will draw the nutrient solution from the bottom of the pot by capillary action causing the roots of the plant to grow downwards in the pot establishing a firm root support system in the inert medium 12. It will be noted that the overflow means provided by the overflow pipe 50 and the aperatures 41 or 80 formed in the sidewalls allow air to enter the bottom of the pot and be supplied to the roots. In a conventional container pot the drainage hole in the bottom of the pot which relieves excess liquid is often covered by water preventing air from getting to the roots. This problem is overcome according to the present invention by utilization of overflow means disclosed herein which is always open to air passage. Thus, not only does the overflow means allow a predetermined level of liquid to remain in the pot but at the same time it provides aeration to the root system eliminating the likelihood that outside air is blocked from the roots as in the case of the prior container pots.

While a preferred embodiment of the invention has been described using specific terms, such description is for illustrative purposes only, and it is to be understood that changes and variations may be made without departing from the spirit or scope of the following claims.

What is claimed is:

1. A hydroponic system for growing plants in a nutrient solution in an enert medium comprising:
   an open top plant container for containing the inert medium and plant;
   a reservoir for containing said nutrient solution;
   feeder means for automatically maintaining a predetermined level of said nutrient solution in said container including a tube member connected adjacent one end to said reservoir having an open end at a remote end thereof for dispensing said solution;
   means for carrying said tube member in said container with said open end disposed at a predetermined distance above the bottom thereof corresponding generally to said predetermined level;
   valve means for selectively blocking flow in said tube member so as to prevent flow therethrough when said reservoir is being filled including at least a section of said tube member outside of said container consisting of flexible tubing bendable upon itself for effecting blockage of flow through said tubular member; and
   air vent means communicating with said tube member allowing air to enter said reservoir in response to the level of said nutrient solution in said container falling below a portion of said open end of said tube member.

2. The system set forth in claim 1 wherein said means for carrying said tube member includes an opening formed in a sidewall of said container with said tube member carried therein.

3. The system set forth in claim 2 wherein said air vent is defined by an upstanding air vent tube extending upwardly from and communicating with said tube member.

4. The system set forth in claim 2 wherein said reservoir includes an inlet through which said reservoir is filled having a closure member for selectively opening and closing said inlet.

5. The system set forth in claim 1 including overflow means formed in said container for limiting the level of liquid in said container to a predetermined depth and providing unobstructed aeration of the media and plant roots.

* * * * *